United States Patent
Delahaye

(10) Patent No.: US 8,612,552 B2
(45) Date of Patent: Dec. 17, 2013

(54) METHOD FOR BUFFERING STREAMING DATA AND A TERMINAL DEVICE

(75) Inventor: Nicolas Delahaye, Marly le Roi (FR)

(73) Assignee: NXP B.V., Eindhoven (NL)

( * ) Notice: Subject to any disclaimer, the term of this patent is extended or adjusted under 35 U.S.C. 154(b) by 268 days.

(21) Appl. No.: 13/126,394

(22) PCT Filed: Oct. 26, 2009

(86) PCT No.: PCT/IB2009/054731
§ 371 (c)(1),
(2), (4) Date: Apr. 28, 2011

(87) PCT Pub. No.: WO2010/049879
PCT Pub. Date: May 6, 2010

(65) Prior Publication Data
US 2011/0202637 A1    Aug. 18, 2011

(30) Foreign Application Priority Data
Oct. 28, 2008   (EP) ...................................... 08291010

(51) Int. Cl.
*G06F 15/16*   (2006.01)
(52) U.S. Cl.
USPC ............................ 709/219; 709/217; 709/218
(58) Field of Classification Search
USPC ............ 709/219, 227–234, 250; 725/86–153; 370/229–240
See application file for complete search history.

(56) References Cited

U.S. PATENT DOCUMENTS

| | | | | |
|---|---|---|---|---|
| 6,247,072 | B1 * | 6/2001 | Firestone | 710/53 |
| 6,473,900 | B1 * | 10/2002 | Pham et al. | 725/63 |
| 6,625,655 | B2 * | 9/2003 | Goldhor et al. | 709/231 |
| 6,768,433 | B1 * | 7/2004 | Toth et al. | 341/105 |
| 7,050,809 | B2 * | 5/2006 | Lim | 455/445 |
| 7,424,730 | B2 * | 9/2008 | Chou | 725/87 |
| 7,706,384 | B2 * | 4/2010 | van Beek | 370/395.4 |
| 7,890,983 | B2 * | 2/2011 | Chen et al. | 725/85 |
| 8,122,141 | B2 * | 2/2012 | Price | 709/231 |
| 8,467,819 | B2 * | 6/2013 | Allen et al. | 455/518 |
| 2002/0013949 | A1 * | 1/2002 | Hejna, Jr. | 725/100 |
| 2002/0031126 | A1 * | 3/2002 | Crichton et al. | 370/394 |
| 2002/0116178 | A1 * | 8/2002 | Crockett | 704/200.1 |
| 2002/0199001 | A1 * | 12/2002 | Wenocur et al. | 709/227 |

(Continued)

OTHER PUBLICATIONS

International Search Report and Written Opinion for Application PCT/IB2009/054731 (Apr. 7, 2010).

*Primary Examiner* — Hassan Kizou
*Assistant Examiner* — Phyllis Book

(57) ABSTRACT

A method of streaming data from a server (S) at a server data rate (Cs) via a network to at least one terminal at a terminal reception data rate (Crec) is provided. A streaming section from the server (S) is requested by the terminal (T). Streaming data is forwarded from the server (S) to the network (N) at a server data rate (Cs) and from the network (N) to the terminal (T) at a reception data rate (Crec). Data received from the network (N) is buffered in the terminal buffer (AL) for at least a first period. The rendering of the buffered data is initiated after the first period at a first rendering rate (Cren), which is lower than the server data rate (Cs) or the reception data rate (Crec). The first rendering data rate (Cren) is adapted according to the filling of the terminal buffer (AL) with received streaming data until the rendering data rate (Cren) corresponds to the server data rate (Cs).

14 Claims, 3 Drawing Sheets

(56) References Cited

U.S. PATENT DOCUMENTS

Figure 1:
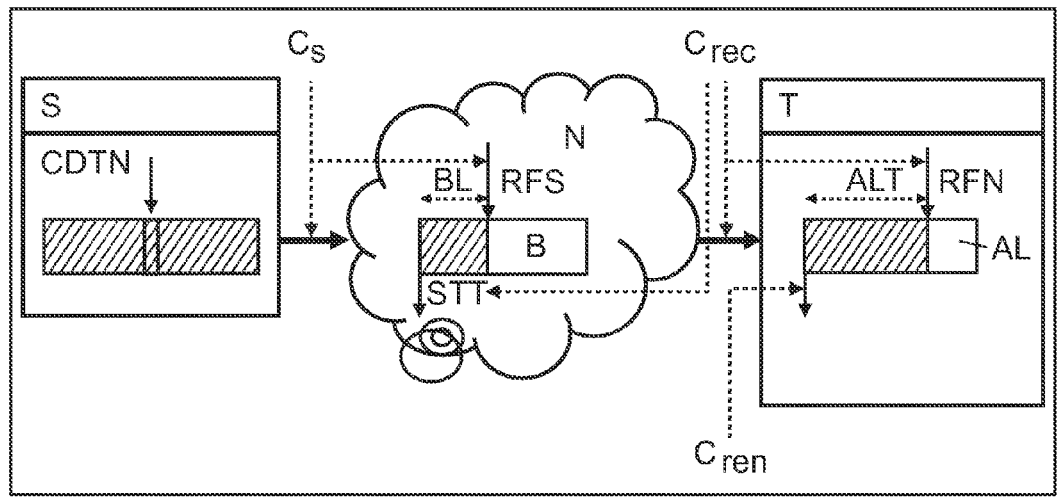

| Publication No. | Date | Inventor | Class |
|---|---|---|---|
| 2006/0104397 A1 | 5/2006 | Lottis et al. | |
| 2006/0143678 A1* | 6/2006 | Chou et al. | 725/118 |
| 2006/0146853 A1* | 7/2006 | Paila | 370/428 |
| 2006/0282261 A1* | 12/2006 | Petef | 704/207 |
| 2007/0140069 A1* | 6/2007 | Holtman et al. | 369/1 |
| 2007/0192812 A1* | 8/2007 | Pickens et al. | 725/94 |
| 2007/0204056 A1* | 8/2007 | Deshpande | 709/231 |
| 2007/0234232 A1* | 10/2007 | Citu et al. | 715/810 |
| 2007/0236599 A1 | 10/2007 | Van Beek | |
| 2008/0012850 A1* | 1/2008 | Keating, III | 345/419 |
| 2008/0020779 A1* | 1/2008 | Ode et al. | 455/450 |
| 2008/0058972 A1* | 3/2008 | Yoneda | 700/94 |
| 2008/0204598 A1* | 8/2008 | Maurer et al. | 348/584 |
| 2009/0023468 A1* | 1/2009 | Zhang et al. | 455/522 |
| 2009/0060458 A1* | 3/2009 | Bauchot et al. | 386/102 |
| 2009/0102969 A1* | 4/2009 | Knutson et al. | 348/471 |
| 2009/0203368 A1* | 8/2009 | Marsyla et al. | 455/418 |
| 2009/0222873 A1* | 9/2009 | Einarsson | 725/115 |
| 2010/0020867 A1* | 1/2010 | Wiegand et al. | 375/240.02 |
| 2011/0107152 A1* | 5/2011 | Adams | 714/43 |
| 2011/0164695 A1* | 7/2011 | Zheng et al. | 375/260 |
| 2012/0188262 A1* | 7/2012 | Rabii | 345/534 |
| 2013/0051472 A1* | 2/2013 | Wiegand et al. | 375/240.16 |
| 2013/0051753 A1* | 2/2013 | Ljolje et al. | 386/239 |

\* cited by examiner

METHOD FOR BUFFERING STREAMING DATA AND A TERMINAL DEVICE

FIELD OF THE INVENTION

The invention relates to a method for buffering streaming data in audio/video applications and a terminal device.

BACKGROUND OF THE INVENTION

Buffering is a common technique deployed in streaming use cases, but it may result in a poor user experience. Buffering is required in the following cases: (1) streaming session start-up (including channel zapping, from one to another one), and (2) jump/seek action initiated by the end user.

An example of a data processing system including a buffer for real-time date is known from U.S. Pat. No. 6,247,072, which discloses apparatus and methods for matching data rates which is useful for a receiver receiving real-time data over a medium. Implementations feature a process establishing a buffer in a receiver; receiving source data from a source having a nominal source data rate, the received source data arriving at an incoming data rate that differs from time-to-time from the nominal source data rate; filling the buffer with source data as it is received at the incoming data rate and emptying the buffer to provide data for consumption in real time at a consumption data rate; setting a rate-matching factor M, the factor M affecting the rate at which the buffer is emptied; and tracking the level of data in the buffer and resetting the value of M to increase the rate at which the buffer is emptied when the buffer fills above a target range, and resetting the value of M to decrease the rate at which the buffer is emptied when the buffer empties below a target range.

Analog media is sampled to be digitalized. This process uses different sample rates depending on audio or video. On one side, audio is commonly sampled from 8 kHz to 48 kHz depending on the use case (<16 kHz for voice content, >16 kHz for music content). On the other side, video may be sampled at 24 Hz by cinema camera, 25 Hz by PAL: European TV standard, about 30 fps by NTSC: US TV standard. During a streaming use case, both the server and the terminal send/consume the media at the same data rate; the server data rate and the rendering data rate are equal and match a real time clock. Cable or terrestrial digital television have constant data throughput, for example the server data rate and the reception data rate are equal. Thus, sent data will be received and rendered by the terminal after a constant delay (transmission time).

FIG. 1 shows a schematic representation of a data processing system according to the prior art. A server S is in charge of sending media to a terminal T via a network N. The server S has real-time behaviour, e.g. it sends media data associated to the server clock. The network N is in charge of carrying data from the server S to the terminal T. A common way to model a network N is to use a buffer B. This buffer B contains data RFS received from the server, and not yet sent to the terminal STT. In this case the network jitter corresponds to the network buffer duration BL. The terminal T—also referred to as "client" or "receiver"—is in charge of receiving and rendering the media from the network N. A terminal T has a media renderer and a buffer AL to manage reception rate variation from the network and consumption rate from the media renderer.

In the context of cable and terrestrial digital television the server sent rate $C_s$ and the terminal reception rate $C_{rec}$ are equal. Thus, both the network N and the terminal buffer AL are constant. Moreover, the sum of these two buffers is about 2 s. Thus, video services have been designed to maximize end-user experience, and thereby the revenues of the broadcaster.

The main end-user insights to have a good end-user experience are: a large number of channels (not addressed by this invention), media rendering must not be interrupted in case of network congestion, quick start up time (~2 s) (from channel selection to first image display) must be provided, fast zapping time (~2 s) (from switch command to a new channel, and first image display of the new channel) must be provided and a quick jump/seek time (~2 s) (from jump/seek command and first image display) must be provided.

In a mobile network the data throughput is not constant, for example the server data rate $C_s$ and the reception data rate $C_{rec}$ are not the same. For instance, when a mobile terminal has a limited network coverage, the server data rate $C_s$ can be higher than the reception data rate $C_{rec}$. This triggers an increase of the network buffer B and a decrease of the terminal buffer AL decrease (as the consumption rate is constant, equal to the server output rate). Thus, the terminal buffer AL has to support this variation to avoid media rendering interruption, e.g. terminal buffer time to be null.

In order to protect against media rendering interruption, the terminal has to buffer a significant amount of data. For instance, it pauses rendering (rendering data rate $C_{ren}$ is null), and waits for the terminal buffer time to increase. Once the terminal buffer time reaches a threshold, the media rendering starts (rendering data rate equals server data rate). Thus, during this buffering time the playback is paused, and the playback starts again once buffering has finished.

The longer the buffering time, the better protection against bandwidth variation is available. Nevertheless, as the server sends data at real-time, the buffering latency is equal to the end-user latency, e.g. the time elapsing between receiving the first media data and the first image display. This results in a poor end-user experience. In a 2.5G network, a common buffering time is about 8 s. In a 3G network, a common buffering time is about 6 s.

This long buffering time is noticeable in two main use cases: (1) at start-up of the streaming session on a media channel (also when the end-user zaps to another channel), and (2) at jump/seek time. Unfortunately the current situation prevents a massive video streaming adoption by the end-user in mobile networks because the main end-user insights have not been achieved. This poor streaming experience prevents operators to sell and deploy additional value services such as video streaming services, even if they are requested by the end-user. Thus, operators are benchmarking terminal solutions to select the one which does have a minimal terminal buffering time.

SUMMARY OF THE INVENTION

It is an object of the invention to provide a method of buffering streaming data and a terminal device which enables the end-user experience by shortening significantly the buffering time.

This object is solved by a method of buffering streaming data according to claim 1 and a terminal device according to claim 6.

Therefore, a method of streaming data from a server at a server data rate via a network to at least one terminal at a terminal reception data rate is provided. A streaming section from the server is requested by the terminal. Streaming data is forwarded from the server to the network at a server data rate and from the network to the terminal at a reception data rate.

Data received from the network is buffered in the terminal buffer for at least a first period. The rendering of the buffered data is initiated after the first period at a first rendering rate, which is lower than the server data rate or the reception data rate. The first rendering data rate is adapted according to the filling of the terminal buffer with received streaming data until the rendering data rate corresponds to the server data rate.

Accordingly, it is possible to start with the rendering of the received streaming data earlier than in the prior art. The initial part of the rendering can be faster or slower than the server data rate. As the rendering data rate will only return to its normal value after the first period, i.e. after a certain amount of data rate is buffered in the terminal buffer. This will enable an improved rendering of the data as the rendering will be continuous. This is not possible according to the prior art as there the rendering will be stopped if not sufficient data is present in the terminal buffer.

According to an aspect of the invention, the adapting of the first rendering data rate is performed by resampling the streaming data buffered in the terminal buffer.

According to a further aspect of the invention, an audio time stretching is performed to resample the streaming data.

According to a further aspect of the invention, the first rendering data rate is decreased with a decreasing filling of the terminal buffer.

According to a further aspect of the invention, the rendering data rate is increased with an increased filling of the terminal buffer.

The invention also relates to a terminal device for receiving streaming data from a server via a network. The terminal device comprises at least one terminal buffer for buffering data received from the network at a reception data rate for at least a first period. The terminal device furthermore comprises a rendering unit for rendering streaming data buffered in the terminal buffer. The terminal device also comprises at least one control unit for requesting a streaming session from the server, for initiating a rendering of the buffered data after the first period at a first rendering rate by the rendering unit and for adapting the first rendering data rate according to the filling of the terminal buffer with received streaming data until the rendering data rate corresponds to the server data rate. The first rendering data rate is lower than the server data rate when the rendering of the streaming data is initiated.

This can be e.g. solved by tuning the rendering clock and stretching the audio playback to avoid noticeable effects of such tuning.

The invention also relates to a data processing system having a server, at least one terminal device and a network to which the server and the terminal device are coupled to. The server sends stream data via the network to the at least one terminal device. The terminal device is implemented as described above.

The invention proposes to reduce buffering latency (for example to about 2 s) regardless of the network type, and to reduce the rendering data rate (playback speed), and then smoothly restoring normal rendering data rate (e.g. to the same rate as the server data rate). This change can be performed in such a way that there is no visible/hearable distortion, in other words such that an end-user noticeable artifact can be avoided. This is achieved by changing the video sample duration (e.g. display each frame during 50 ms rather than 40 ms) and using an audio time stretching algorithm to change sample duration without impacting the pitch.

Pitch represents the perceived fundamental frequency of a sound. It is one of the three major auditory attributes of sounds along with loudness and timbre. While the actual fundamental frequency can be precisely determined through physical measurement, it may differ from the perceived pitch because of overtones, also known as partials, harmonic or otherwise, in the sound. Depending on the stretching algorithm quality, a +/−10% consume rate tuning can be achieved without noticeable artifact, i.e. without affecting the audio pitch.

In particular, the method according to the invention can comprise performing a normal buffering (preferably no longer than 2 s); starting the rendering, with a lower rendering rate; fine-tuning the rendering rate depending on the terminal buffer to achieve server rate and targeted buffer duration; rendering rate equals server rate, and terminal has the targeted buffer protection.

Further aspects of the invention are defined in the dependent claims.

The steps will be explained with reference to the accompanying drawings. An important advantage of the invention is that an operator can provide a better end-user experience without performing any infrastructure change, neither of the server nor of the network.

Embodiments and advantages of the invention will now be described in more detail with reference to the figures.

Figure 2:
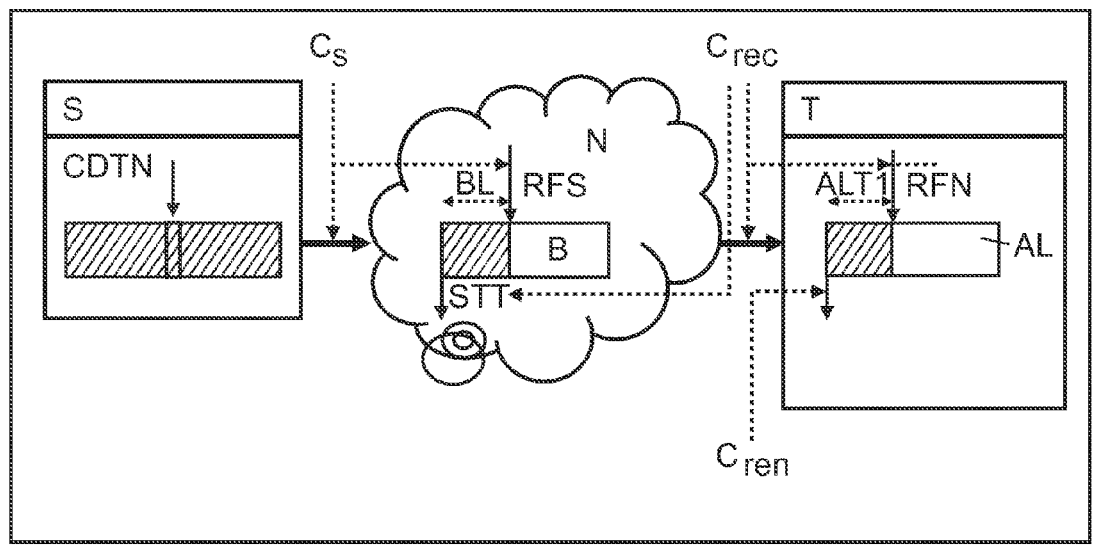
Figure 3:
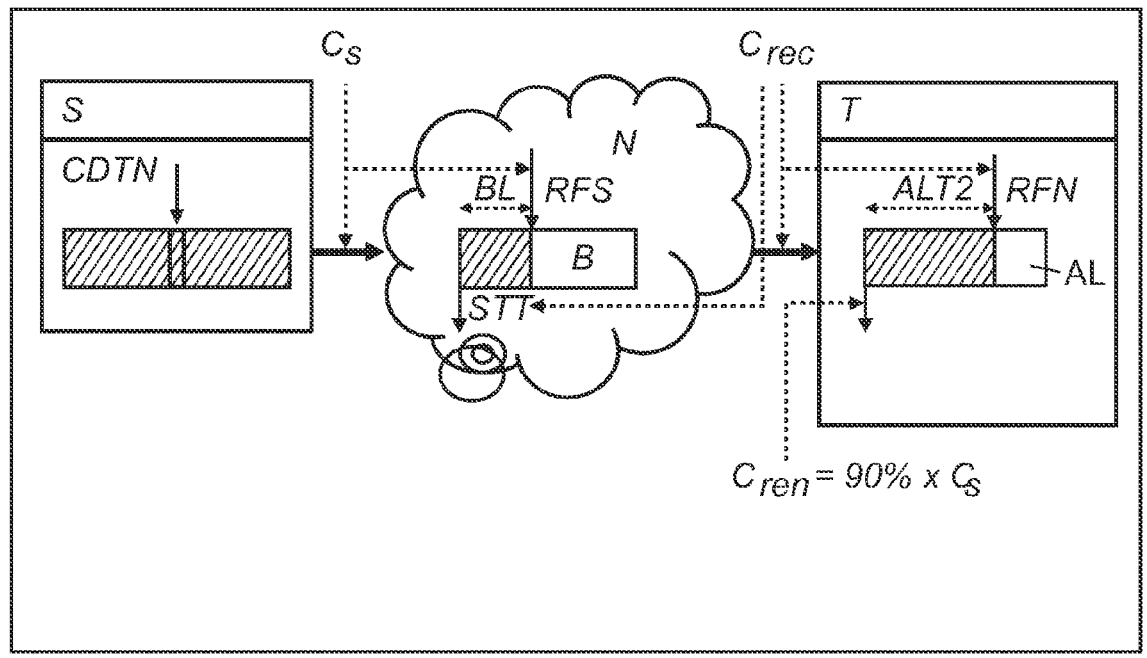
Figure 4:
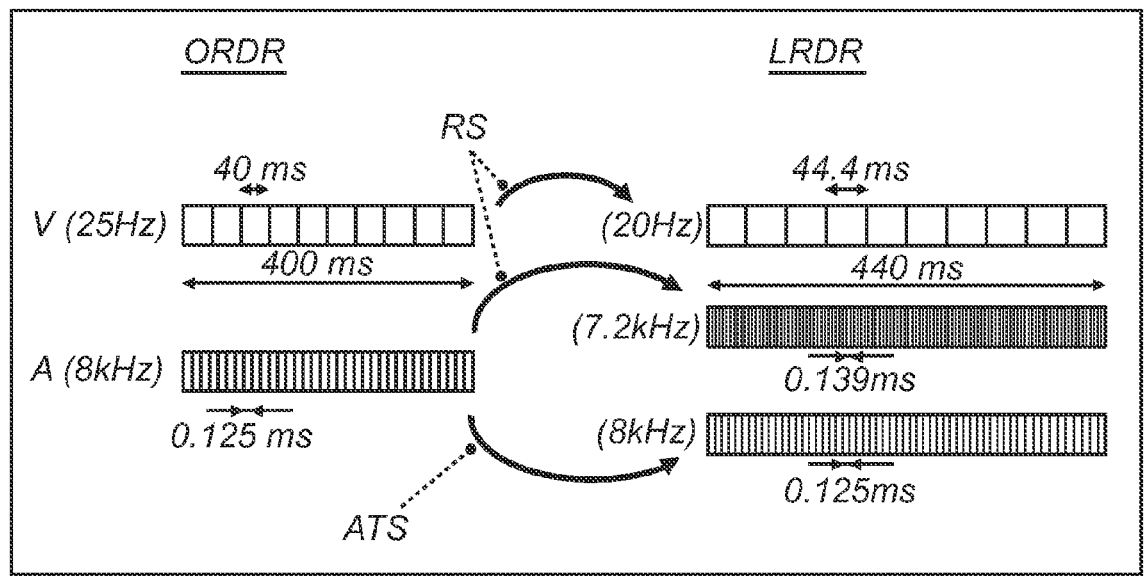
Figure 5:
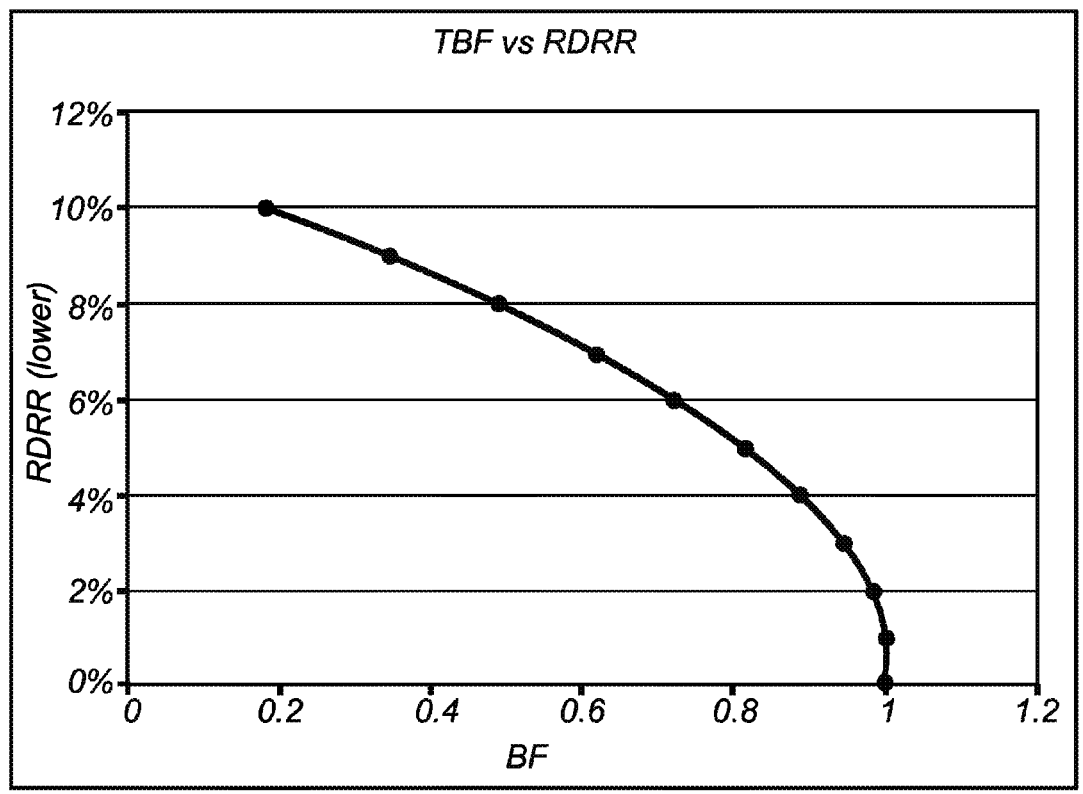
Figure 6:
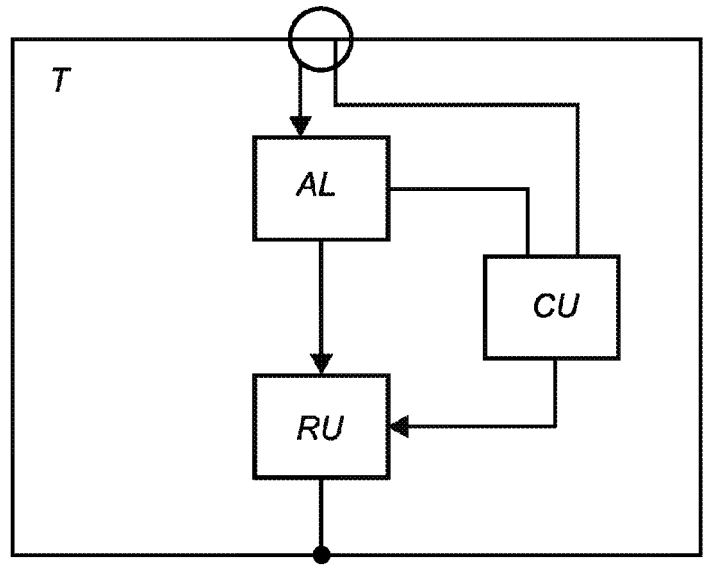

FIG. 1 shows a schematic representation of a data processing system according to the prior art, FIG. 2 shows a schematic representation of a data processing system according to a first embodiment, FIG. 3 shows a schematic representation of a data processing system according to a second embodiment, FIG. 4 shows a schematic representation of a resampling in a method of buffering streaming data according to a third embodiment, FIG. 5 shows a diagram of the buffer filling versus the reception data rate according to the invention, and FIG. 6 shows a block diagram of a terminal device according to a fourth embodiment.

DESCRIPTION OF PREFERRED EMBODIMENTS

FIG. 2 shows a schematic representation of a data processing system according to a first embodiment. The data processing system comprises a server S, at least one terminal T and a network N. Streaming data can be transmitted from the server S at a server data rate $C_S$ via the network N and from the network N at a reception data rate $C_{rec}$ to the terminal T. The terminal comprises a buffer AL for buffering the streaming data. The terminal T can render the buffered data at a rending data rate $C_{ren}$. The network N can comprise a buffer B with a network buffering time BL. The buffer B contains data received from the server RFS but not yet sent to the terminal STT. In FIG. 2, a method of buffering the streaming data is depicted, where normal buffering during a shorter time slot is implemented.

The first step comprises performing buffering within a time slot that comprises substantially ⅓ of the time slot for normal terminal buffering. The first step represents the initial stage; the player or terminal has sent a command to the server S to start a streaming session. As described in the above scheme, the server S starts sending media data to the network N, and the network N brings the media data to the terminal T. Depending on the network congestion the network N can act as a buffer B or not (i.e. a network buffering time BL can be present). During this phase the terminal T does not consume the data, so the terminal buffer AL has a terminal buffer time ALT which is growing to finally reach a threshold ALT1.

On most mobile platforms a few media data (~0.5 s) is required to prefetch overall media rendering chain (e.g. avoid low level platform interruption). Moreover, extra second(s) is/are generally required to absorb video frame size variations in case of a video coding algorithm based on a predictive scheme such as MPEG-4 or H.263/H.264. So the terminal buffer time threshold ALT1 is generally at least equal to 1.5 s. Once the ALT1 threshold has been achieved, the terminal T moves to the second step.

FIG. 3 shows a schematic representation of a data processing system according to a second embodiment. Here, the data processing system comprises a server S, a terminal T and a network N for transporting data from the server S to the terminal T. The network can comprise a buffer B with a network buffer time BL. The buffer B contains data received from the server RFS but not yet sent to the terminal STT. In FIG. 3, a situation is depicted, where the rendering of buffered data with a lower rendering rate $C_{ren}$ is started. The second step comprises starting the rendering with a lower rendering rate. During this phase, the terminal T starts the rendering with a low rendering rate. The server S still sends its data to the network at the same data rate $C_S$, and the network N brings them to the terminal T which receives them at a reception data rate $C_{rec}$. The main difference with step 1 is that the terminal consumes data at the rendering rate $C_{ren}$. However, this rate $C_{ren}$ is lower than the server data rate $C_s$ (e.g. ~10% in a preferred implementation, other reductions are also possible), so for example:

$$C_{ren}=C_S \times 90\%$$

Having a rendering data rate $C_{ren}$ lower than the server data rate $C_S$ has major advantages. It minimizes rendering interruption, because there are more data received than consumed. It is noted that that interruption may still occur if $C_{rec}<C_{ren}$ which happens if network conditions are very bad. In this case, interruption occurrence will be reduced by means of the method according to the invention. It continues filling the terminal buffer (see the third step).

FIG. 4 shows a schematic representation of a resampling in the method of buffering streaming data according to a third embodiment. The original rendering data rate ORDR is resampled to a lower rendering data rate LRDR. The lowering of the rendering data rate requires a resampling of digital content to a lower rate. Media resampling is a well known technique as will be explained with reference to FIG. 4. Video resampling (lower) can be performed by increasing the laps time between two video frames (e.g. moving from 40 ms to 44.4 ms with 10% lower rate). It does not require any complex interpolation as deviation is very limited. Moreover this processing does not create visible artifacts.

However, it should be noted that the same technique can not be used for audio, because it will lead unpleasant effects (like speeding up/down the audio tape playback). Basic resampling changes the sampling frequency and the audio pitch which creates a noticeable artifact. To avoid this artifact, the proposed solution uses an audio time stretcher algorithm. This algorithm allows resampling an audio stream without changing its pitch or its sampling frequency.

Depending on the audio time stretching quality, a +/−10% rendering rate tuning can be achieved without impacting the audio pitch. In this case rather than displaying a 15 frames per second stream (66 milli-seconds between frames) a 10% lower speed rate will be 13.5 frames per seconds (73 milli-seconds between frames), and without any noticeable audio artifact. It is noted that this step is a transitory step. Terminal does not stay in this step, and moves to the third step.

In the following, a third step in the method according to the invention is described. It relates to the fine tuning of the rendering rate depending on the terminal buffer in order to achieve a nominal rendering rate and a targeted buffer duration.

The rendering rate speed-up according to the invention must be as smooth as possible to avoid artifacts in case of a sudden rendering rate change. According to a preferred embodiment, if a 1% linear step is used, for example with a 10% lower rate at step 2, then step 3 will move smoothly from 10% (step 2) to 0% (step 4) by 1% substeps. The buffer filling over the time is shown in FIG. 5. In FIG. 5, a graph is depicted showing the relation between the rendering data ratio RDRR with respect to the normalized buffer filling BF.

So according to the terminal buffer filling, the appropriate reception data rate can be tuned in order to match the targeted terminal filling. Step 3 takes some time to operate, but it does not have incidence on the end-user experience, as media rendering has started at step 2. This lead time mainly depends on two criteria. The first criterion comprises the number of steps (and step value) and the rules to move from lower rate (eg 10%) to 0%. This is an implementation choice and its mainly depends on the audio time stretcher quality. It is noted that several rules can be used (linear or logarithm) with a high number of steps or a very limited number of steps. The second criterion comprises the reception data rate $C_{rec}$. This value is dynamic; it depends on the network load. Its variation will impact the buffer filling, so the terminal may have to increase or decrease the rendering data rate according to the buffer filling. This stage ends (moves to step 4) once the targeted terminal buffer time ALT2 has been reached with a 0% rendering data rate ratio: eg $C_{ren}=C_s$ In the following, the fourth step in the method according to the invention is described. The fourth step relates to a situation where the rendering rate equals the server rate and the terminal has a targeted buffer protection.

In this step, the terminal has achieved the targeted buffer protection ALT2. The rendering data rate equals the server data rate ($C_{ren}=C_s$), so the terminal is in an optimal streaming condition. It is noted that the step 3 approach can also be used during overall rendering experience. Since the reception data rate is not constant, the terminal buffer is not stable, so using step 3 allows minimizing the media streaming interruption during rendering experience.

FIG. 6 shows a block diagram of a terminal device according to a fourth embodiment. The terminal device comprises a terminal buffer AL for a buffering of incoming streaming data, a control unit CU and a rendering unit RU for rendering streaming data buffered in the terminal buffer AL. The control unit CU is adapted to request a streaming session from the server S. Furthermore, when the streaming session has started and streaming data is buffered in the terminal buffer for a first period, the control unit CU is adapted to initiate a rendering of the buffered data at a first rendering rate after the first period. The first rendering data rate is lower than the server data rate. Moreover, the control unit CU is adapted to adapt the first rendering data rate according to the filling of the terminal buffer with the received streaming data.

It should be noted, that the terminal device according to the fourth embodiment is adapted to perform the method of buffering streaming data as described according to the first, second or third embodiment.

The invention targets any terminal performing media streaming on a network with a variable reception data rate. It mainly addresses mobile terminals, but it can also address PC's with an over-the-air network (Wifi, WiMax, 2.5G, 3G, LTE etc.).

It is remarked that the scope of protection of the invention is not restricted to the embodiments described herein. Neither is the scope of protection of the invention restricted by the reference symbols in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general-purpose processor. The invention resides in each new feature or combination of features.

The invention claimed is:

1. A method of buffering streaming data from a server at a server data rate via a network to at least one terminal device at a terminal reception data rate, the method comprising:
    requesting a streaming session from the server by the terminal device;
    forwarding streaming data from the server to the network at a server data rate and from the network to the terminal device at a reception data rate;
    buffering data received from the network in a terminal buffer of the terminal for at least a first period;
    rendering the buffered data, after the first period, at a first rendering rate which is lower than the server data rate; and
    adapting the first rendering data rate according to a filling of the terminal buffer with received streaming data until the rendering data rate substantially equals the server data rate, wherein the adapting of the first rendering data rate occurs in a plurality of steps and a total number of the plurality of steps depends upon audio time stretcher quality.

2. The method according to claim 1, wherein the adapting of the first rendering data rate is performed by resampling the streaming data buffered in the terminal buffer.

3. The method according to claim 1, further comprising:
    performing an audio time stretching to resample the streaming data.

4. The method according to claim 1, further comprising:
    increasing the first rendering data rate with an increasing filling of the terminal buffer.

5. The method according to claim 1, further comprising:
    decreasing the first rendering data rate with decreased filling of the terminal buffer.

6. The method of claim 1, wherein the first period is substantially one third of a time slot for normal terminal buffering.

7. The method of claim 1, further comprising:
    using a terminal buffer time threshold to end the buffering step.

8. The method of claim 7, wherein the terminal buffer time threshold is substantially 1.5 seconds.

9. The method of claim 1, wherein the first rendering rate is substantially 10% lower than the server data rate.

10. The method of claim 1, wherein each step is linear.

11. The method of claim 1, wherein each step is substantially 1% of the server data rate.

12. The method of claim 1, wherein each step is logarithmic.

13. A terminal device for receiving streaming data from a server via a network, the terminal device comprising:
    at least one terminal buffer configured to buffer data received from the network at a reception data rate for at least a first period;
    a rendering unit configured to render streaming data buffered in the terminal buffer; and
    at least one control unit configured to request a streaming session from the server, render the buffered data after the data has been buffered for a first period at a first rendering rate by the rendering unit, wherein the first rendering data rate is lower than the server data rate, and adapt the first rendering data rate according to filling of the terminal buffer with received streaming data until the rendering data rate substantially equals the server data rate, wherein adapting of the first rendering data rate occurs in a plurality of steps and a total number of the plurality of steps depends upon audio time stretcher quality.

14. A data processing system, comprising:
    a server configured to forward streaming data;
    a network configured to receive data from the server; and
    the terminal device according to claim 13.

* * * * *